(12) United States Patent
Nazginov et al.

(10) Patent No.: US 6,585,305 B2
(45) Date of Patent: Jul. 1, 2003

(54) MOBILE SHOWROOM ADVERTISING VEHICLE

(76) Inventors: Arthur Nazginov, 58-25 Laurel Hill Blvd., Woodside, NY (US) 11377; Lillian Nazginov, 58-25 Laurel Hill Blvd., Woodside, NY (US) 11377

( * ) Notice: Subject to any disclaimer, the term of this patent is extended or adjusted under 35 U.S.C. 154(b) by 0 days.

(21) Appl. No.: 09/940,392

(22) Filed: Aug. 27, 2001

(65) Prior Publication Data

US 2003/0038494 A1 Feb. 27, 2003

(51) Int. Cl.[7] ............................................. B60R 13/00
(52) U.S. Cl. ........................ 296/21; 296/181; 296/183
(58) Field of Search ............................ 296/21, 181, 183

(56) References Cited

U.S. PATENT DOCUMENTS

| | | | |
|---|---|---|---|
| 1,617,940 A | * 2/1927 | Chase | 296/21 |
| 5,263,756 A | 11/1993 | Gaspar | 296/21 |
| 5,833,293 A | * 11/1998 | Ludwig | 296/21 |
| 5,918,924 A | 7/1999 | Cowan | 296/21 |
| 5,974,711 A | 11/1999 | Tipke | 40/591 |
| 6,122,850 A | 9/2000 | Strzeletz | 40/591 |

* cited by examiner

*Primary Examiner*—D. Glenn Dayoan
*Assistant Examiner*—Lori L Coletta

(57) ABSTRACT

A mobile showroom for displaying merchandise such as furniture and clothing, is comprised of a drivable truck body that has a freight section converted to a merchandise showroom with see-through panels and, optionally, scrolling displays that can be used to showcase the merchandise or show different types of merchandise, or to provide transparent sections through which the merchandise itself may be viewed.

15 Claims, 6 Drawing Sheets

MOBILE SHOWROOM ADVERTISING VEHICLE

BACKGROUND OF THE INVENTION

The present invention relates to advertising systems and, more particularly, to a vehicle mounted, mobile merchandise showroom.

Over the past decade, various patents have issued for vehicle based advertising systems. Thus, U.S. Pat. No. 6,122,850 describes a mobile billboard system in which a plurality of display panels are mounted integrally to the sides and/or rear of a motor vehicle. The display panels are constructed of transparent material and a light source is used for providing rear lighting.

Window-mounted advertising signs that are vehicle-based are further described in U.S. Pat. No. 5,974,711, including a special mechanism for easy attachment of such advertising to vehicle windows.

U.S. Pat. No. 5,918,924 to Cowan describes a mobile multi-message billboard advertising system which essentially consists of a plurality of tri-visional, action display units that are affixed to a superstructure mounted on a truckbed. The advertising system is capable of displaying a plurality of different messages sequentially through movement of the tri-visional, action display units in a manner that is intended to draw attention to the displayed messages.

A scrolling display sign for vehicles is described in U.S. Pat. No. 5,412,892 for use on vehicles such as taxis and the like. The system includes dispensing and take up rollers containing a strip of material having a series of advertising or messages thereon. The advertising display strip is installed within the transparent, peripheral sides of the device, thereby providing for omnidirectional display of messages. The messages can be viewed by daylight or through internal illumination. U.S. Pat. No. 5,263,756 described an advertising vehicle which has opposing and spaced apart walls comprising television screens and associated power sources and electronics that enable messages to be displayed to pedestrians through television monitors facing in different directions.

A "moving-ad" vehicle serving as an advertising system is described on the Internet website of the Motionmarketing.com company. This known advertising system enables the display of numerous messages via a computer controlled electromechanical assembly. The system is marketed by Brands In Motion, which is a division of Safehouse Media Inc.

In the mobile advertising systems described above, the public is always exposed to only pictorial renditions of merchandise, not to the merchandise itself. Many customers like to see the actual merchandise that is the subject of the advertising messages. Indeed, this is the reason that most retail establishments have showrooms that display actual merchandise, rather than pictorial renditions of merchandise.

SUMMARY OF THE INVENTION

Accordingly, it is an object of the present invention to provide an advertising system that includes the benefits of mobility.

It is another object of the present invention to provide an advertising system that provides the advantages of showcasing merchandise in a mobile system.

It is a further object of the invention to provide an advertising system that increases the exposure of merchandise to the purchasing public.

Still a further object of the invention is to provide an advertising system that combines the advantages of mobility, showcasing of merchandise and a scrolling display of advertising messages, in a system that can be implemented with known technology.

The foregoing and other objects of the invention are realized by the mobile advertising system of the present invention, which essentially comprises a truck-style vehicle, having side wall panels constructed of transparent panels, enabling seeing into the interior of the truck. The interior of the truck is arranged in the manner of a retail showroom, or show window, comprising an arrangement of merchandise of a particular class of goods, e.g., furniture, tools, clothing and the like. The interior of the truck is provided with various hardware for securing the merchandise in place, to protect against vehicular sudden motions, as during stops, sharp turns and the like. The vehicle is optionally outfitted with special lighting systems mounted in the ceiling, floor and/or side panels that enable illuminating the merchandise in an attention attracting fashion, e.g., with either steady or colorful lighting for obtaining special daytime or nighttime effects.

Optionally, one or more of the rear, left-hand or right-hand side panels is fitted with scrolling display signs in the form of an elongated strip of material having a series of advertising and/or other messages thereon and including see-through or transparent panels that enable seeing into the interior of the vehicle and therefore, the showroom itself.

The sign scrolling system is generally similar to it the system described in the aforementioned U.S. Pat. No. 5,412,892, the contents of which are incorporated by reference herein. The inventors herein further incorporate by reference the contents of U.S. Pat. Nos. 5,263,756; 5,918,924; 5,974,711; and 6,122,850, the disclosure of which may be usable to construct subcomponents of the present invention.

As further optional features, the invention may include a section of the truck located between the cab and the showroom, which is closed off and serves as a storage space. In this manner, the invention provides the ability of live showcasing of merchandise over short and long distances, changing the merchandise in the showroom or selling merchandise to customers directly from the truck. The advertising truck of the present invention may be deployed adjacent to halls, hotels or trade centers that host trade shows, fairs, events and other markets that advertisers may wish to reach. The invention realizes savings in use of manpower and time in planning and implementing advertising presentations.

Other features and advantages of the present invention will become apparent from the following description of the invention which refers to the accompanying drawings.

DETAILED DESCRIPTION OF EMBODIMENTS OF THE INVENTION

Figure 1:
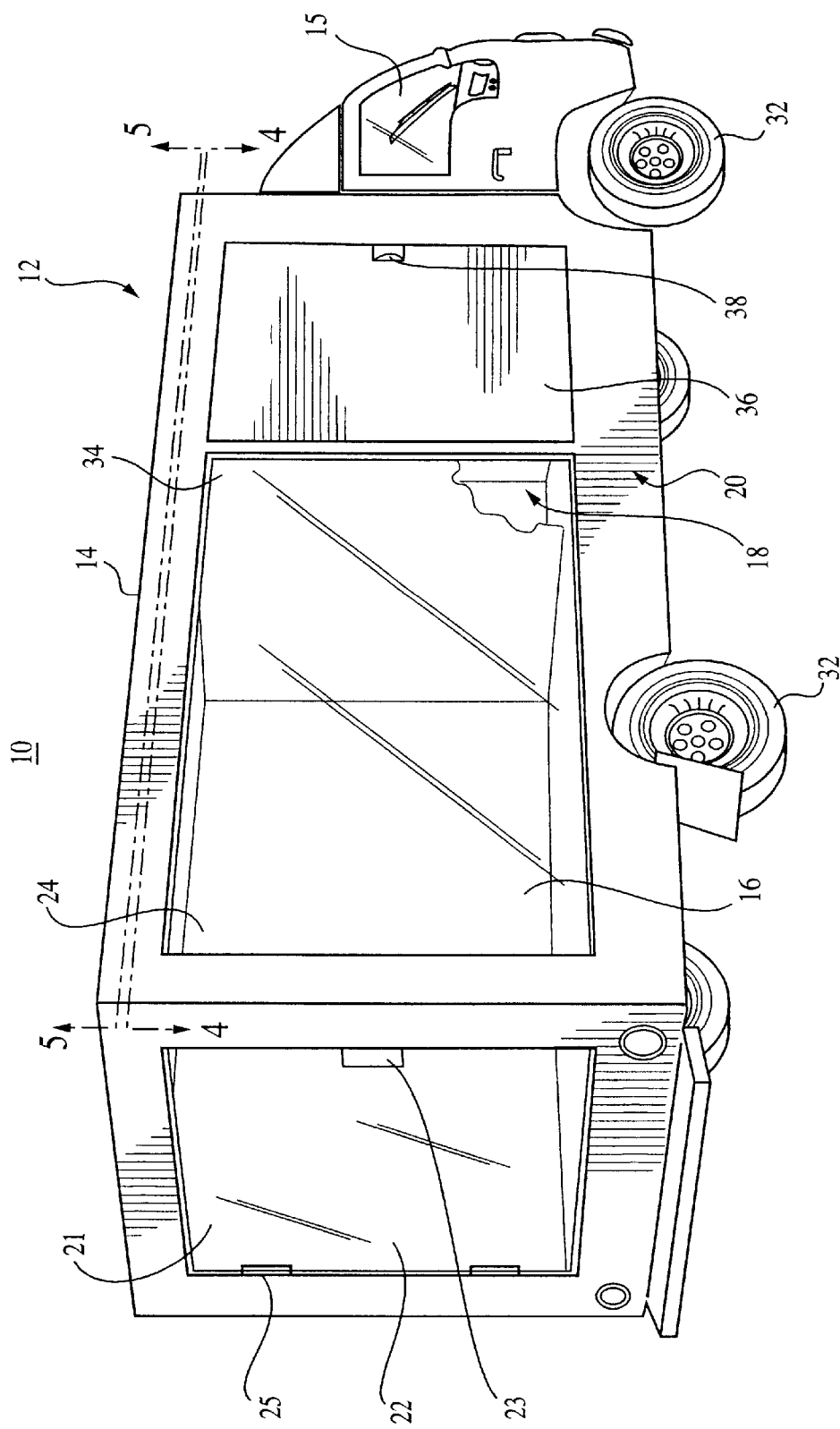
FIG. 1 is a perspective of the mobile showroom of the present invention.

Referring to the drawings, FIG. 1 is a perspective of the mobile showroom 10 of the present invention, which is intended to bring to the attention of potential customers, wherever they are, an actual display of merchandise, preferably accompanied by advertisements in various forms, as described below.

As described below, the mobile showroom 10 comprises a vehicle 12 that has a driver's cabin 15 and a freight cabin 20. The freight cabin 20 is illustrated to be substantially of rectangular shape, with a superstructure 14, defined by various side walls or panels, including a rear wall 22, a driver's-side panel 24 and a passenger-side panel 26, as well as a front panel 34. These walls or panels define an interior space 16, in which a collection of merchandise, such as furniture and the like, is intended to be arranged. The interior 16, which is the actual showroom, is optionally separated from the driver cabin 16 by a storage space 18, to which access may be had via side door 36 that can be opened by handle 38. Access to the showroom 16 may be provided through a rear door 21, having a door handle 23 and supported by hinges 25.

Significantly, the side walls 22, 24 and 26 are largely constructed of a transparent material, such as glass or transparent plastic that enables free and substantially unobstructed viewing of the contents of the showroom 16. The mobile showroom 10 can be provided separately, as a separable trailer of the truck cabin 16, so that it can be parked at the location of a trade show or a busy street, or it can be permanently mounted on the wheels 32 and constantly driven through streets and on highways to permit maximum exposure of the showroom contents to the viewing public.

Figure 2:
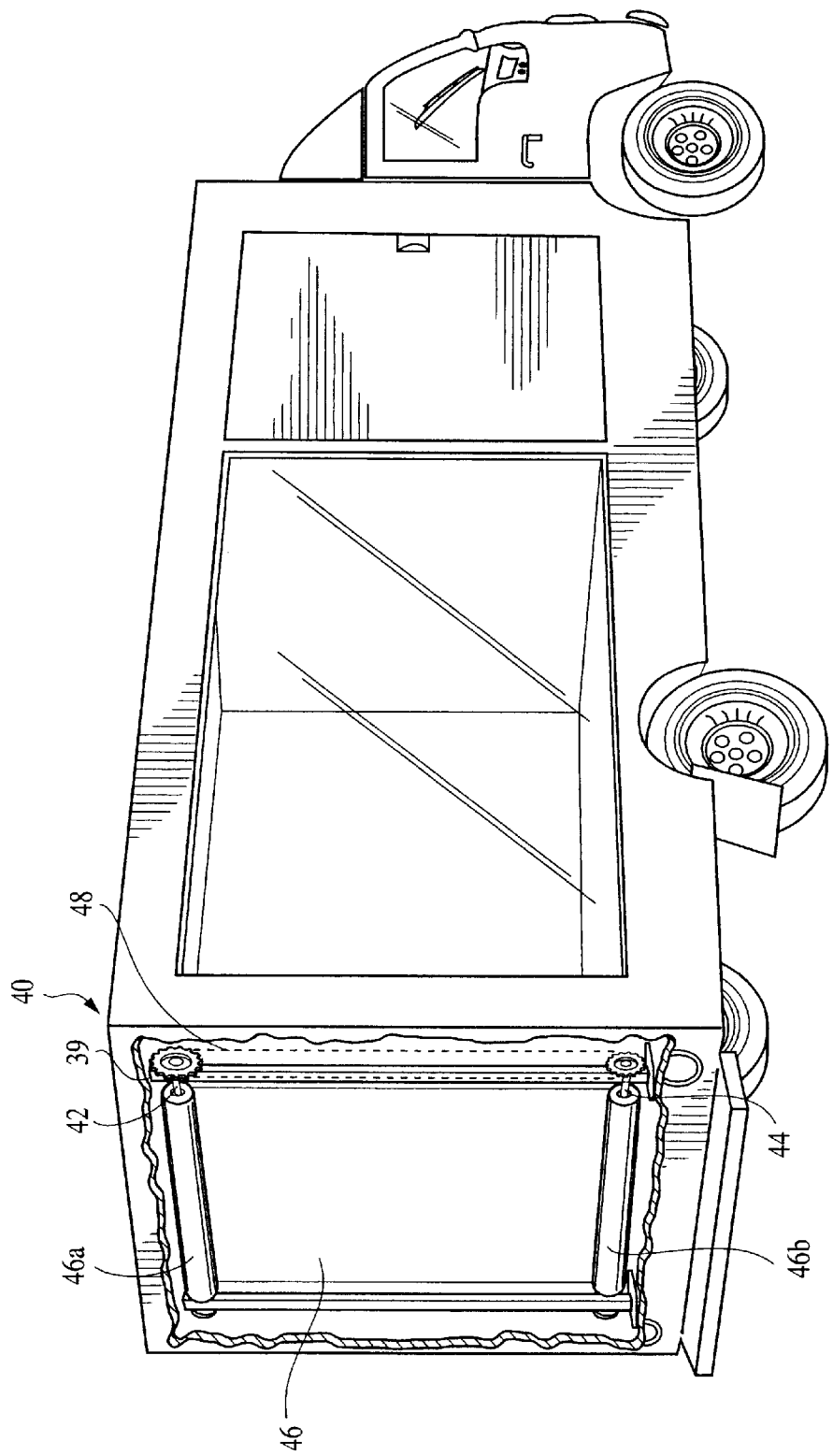
FIG. 2 is an exploded view of a portion of the mobile showroom of FIG. 1, showing a mechanism for a scrolling display.

A limitation of the mobile showroom 10 is that the interior space 16 available for the display of merchandise such as sofas, chairs, etc., is quite obviously limited, inasmuch as only few samples of a couch or a chair or a lamp can be displayed at a time. With reference to FIG. 2, the utility of the present invention is further enhanced by providing at one or more (or all) of the transparent side walls, a scrolling display 40. The scrolling display 40 is supported in the superstructure 39 of the truck and essentially consists of a pair of concealed rotatable rods 42 and 44, on which there is wound, a long sheet or strip 46 that is divided lengthwise into individual sections, e.g., 19a, 19b, 19c, that fit the panel display size. Each strip section comprises a different message, advertisement, etc. that can be left stationarily located at a particular one of the side walls, or scrolled or exchanged from time to time. Each of the elongated sheets or strips has a portion 46a that is rolled up on the top rod 42 and another section 46b on the bottom rod 44. At least one or more of these strip sections can be transparent, enabling clear viewing of the merchandise within.

Thus, if the interior demonstrates a sofa or chair of a particular style, the screens can be scrolled from time to time to illustrate similar sofas or slightly different sofas finished with the same or differently colored or styled fabrics and matching different pieces of furniture, in order to allow passersby to be attracted to the displayed merchandise. Messages may also include order information in the form of telephone numbers, website locations and the like.

Figure 3:
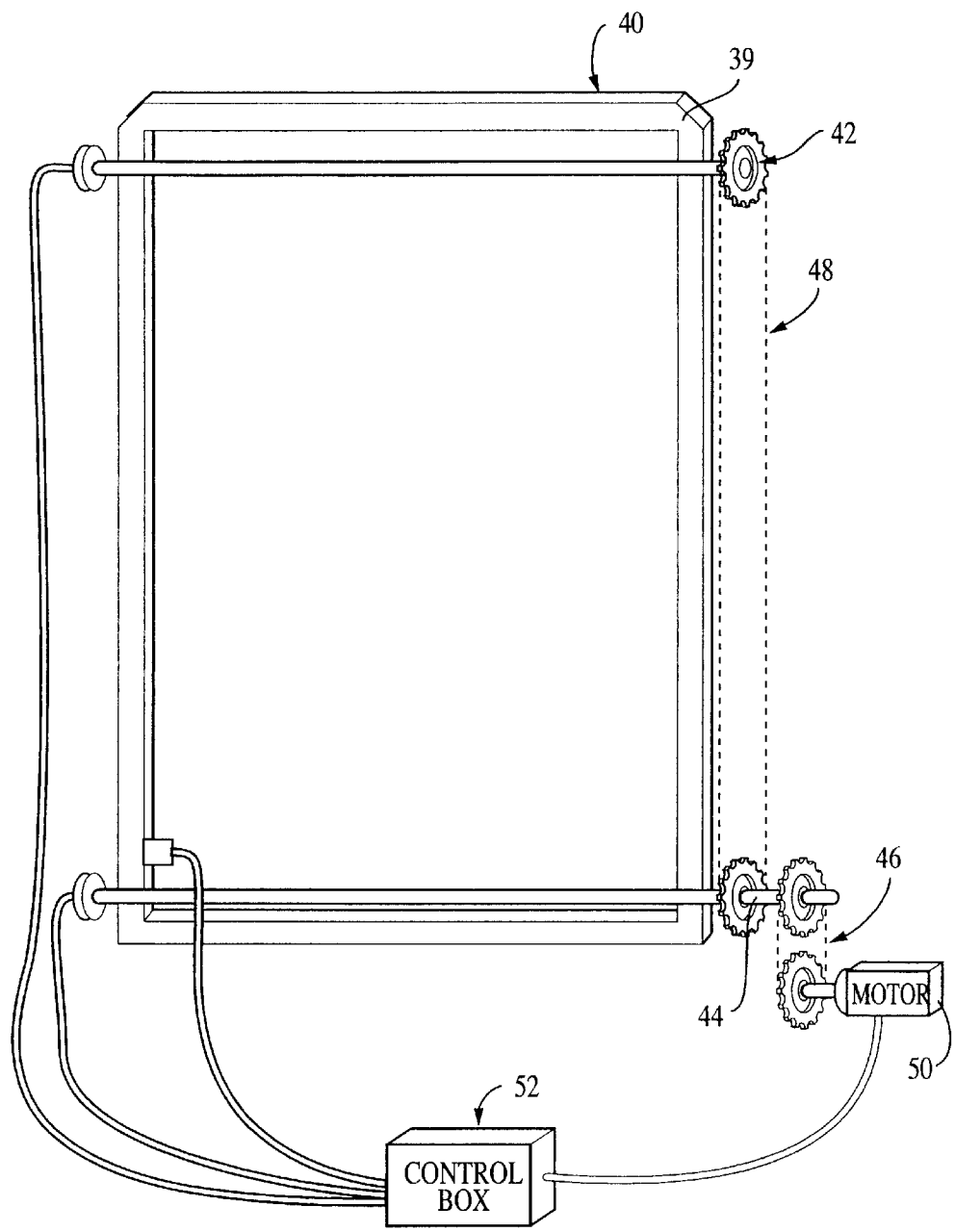
FIG. 3 is a diagram of the scrolling display and associated control hardware.
Figure 3A:
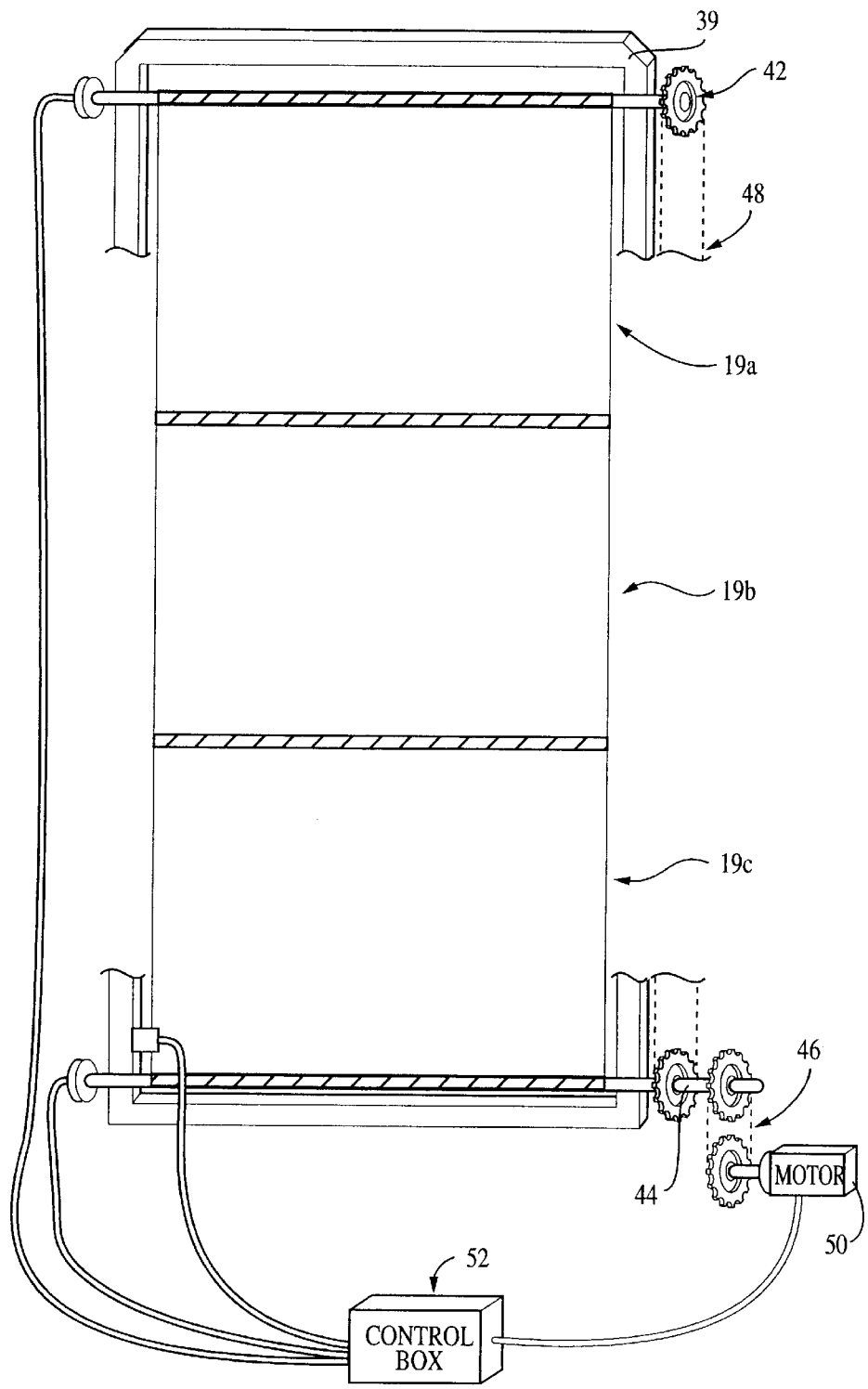
FIG. 3A shows further details of the scrolling display of FIG. 3.

The sheet 46 is rolled on the rod via a chain 48 that is driven by a motor 50 (FIG. 3). The motor 50 may be coupled to the bottom rod 44 by a suitable gear mechanism 46, and the motor 50 may be itself controlled by a electrical/electronic control box 52 which may have an operator panel for controlling the display of information or which may be operated by a timed controller that scrolls the messages at the different panels at predetermined rates, or in accordance with a preprogrammed procedure that may be stored in control box 52 (FIG. 3).

Figure 4:
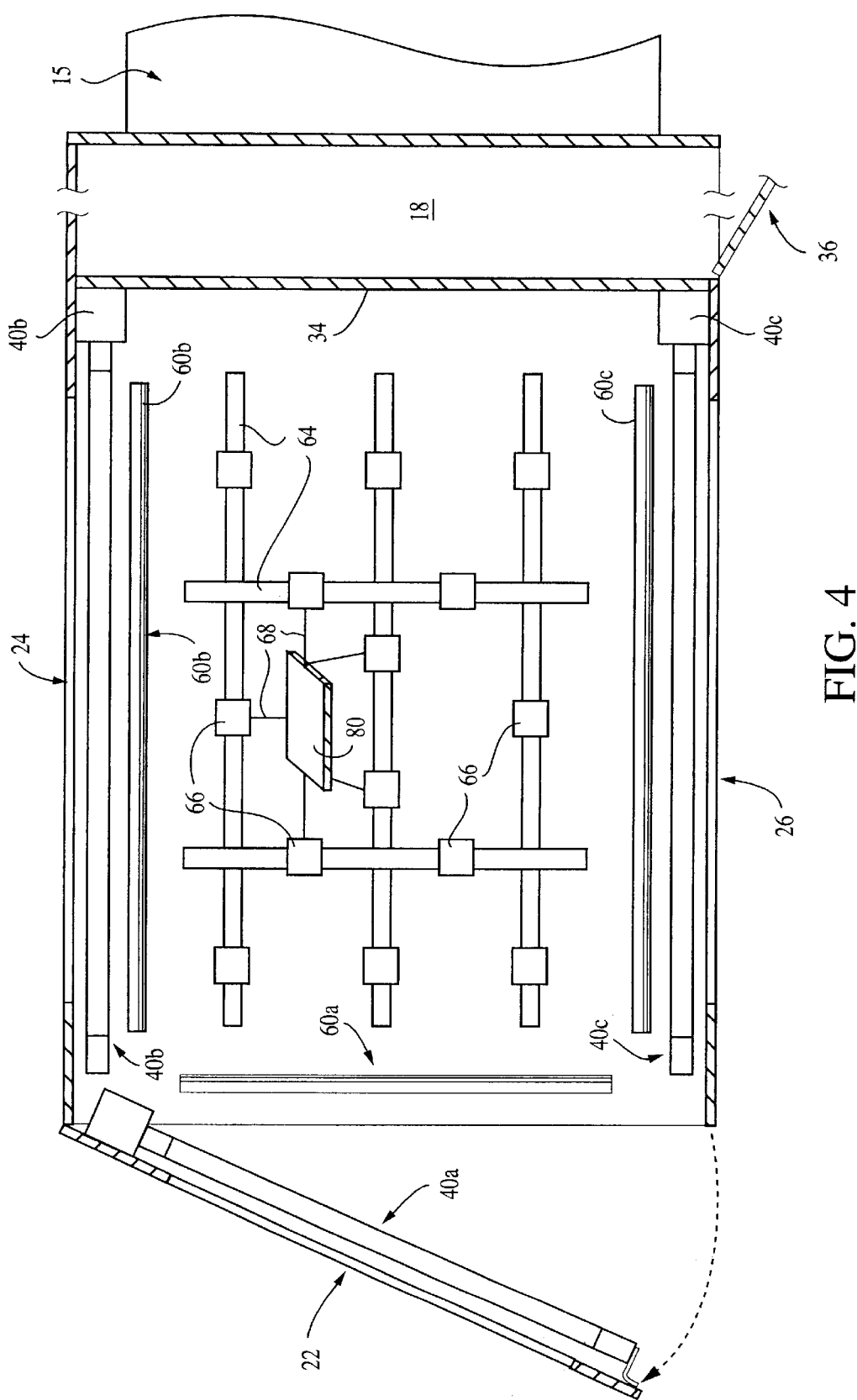
FIG. 4 is a cross-section showing the mobile showroom of FIG. 1, as seen through lines 4—4 thereof.
Figure 5:
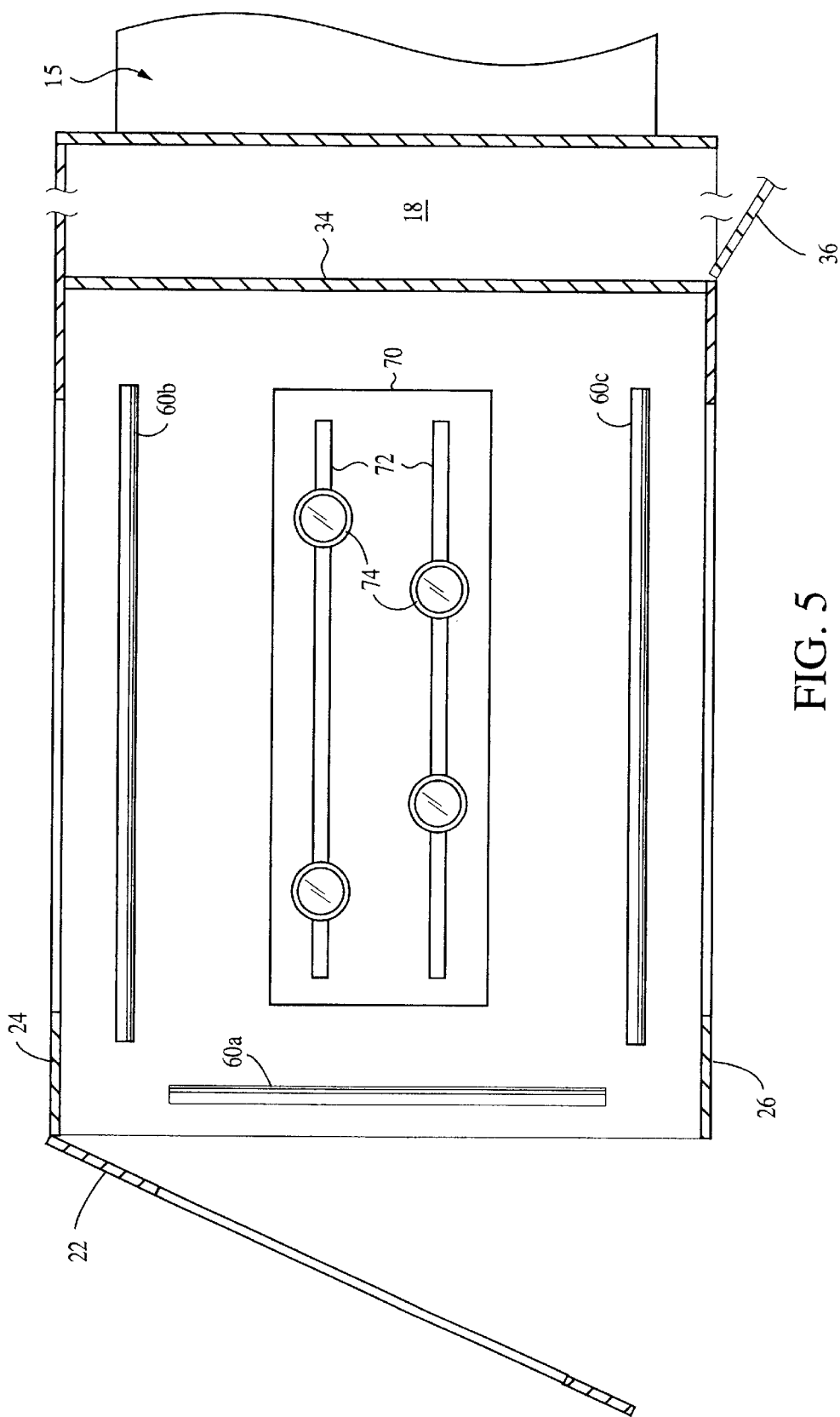
FIG. 5 is another cross-section of the FIG. 1 mobile showroom, as seen through lines 5—5 thereof.

With further reference to FIGS. 4 and 5, several scrolling displays, including scrolling displays 40a, 40b and 40c may be provided adjacent each of the side panels 22, 24 and 26, respectively, so that different messages may display on different sides of the mobile showroom 10, or that a scrolling display may be operated on one panel, while a view of the actual merchandise is provided through the remaining panels.

FIG. 4 illustrates lighting fixtures 60a, 60b and 60c, provided slightly above or adjacent or on the floor level to provide illumination for the panels 22, 24 and 26. Overhead illumination can be provided at the ceiling, including by way of a fixture 70 which has tracks 74 on which can be mounted movable lighting fixtures 72 that can be aimed in desired manners at the merchandise.

To ensure that the merchandise can be secured against moving while the mobile showroom is in transit, a floor tracking system 64, comprising longitudinal and lateral tracks, may be provided at the flooring of the mobile showroom. On the tracking 64, there may be provided movable tying stations 66, to which merchandise 80 may be secured via tying rods or cables 68.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is::

1. A mobile merchandise showroom, comprising:
   a mobile superstructure mounted on wheels;
   a merchandise showroom defined by the superstructure and serving to hold a plurality of merchandise items;
   the showroom being at least partially defined by a plurality of panels including a rear panel, a driver-side panel and a passenger-side panel and at least two of said panels are substantially constructed of transparent material which enable viewing of the merchandise items from outside the mobile merchandise showroom;
   further including at least one scrolling display comprising an elongated sheet, including a plurality of displayable advertisements or messages that are visible through at least one of the panels;
   wherein the sheet includes at least one transparent section through which the merchandise items in the showroom are visible.

2. The mobile merchandise showroom of claim 1, in which the merchandise showroom is constructed of a freight compartment of a truck-style vehicle.

3. The mobile merchandise showroom of claim 1, further including a storage space for storing merchandise that is not being exhibited to the public.

4. The mobile merchandise showroom of claim 1, further including an openable door to the merchandise showroom.

5. The mobile merchandise showroom of claim 1, in which the at least one scrolling display comprises winding rods on which the sheet is rollable.

6. The mobile merchandise showroom of claim 5, further including a winding motor for driving at least one of the winding rods.

7. The mobile merchandise showroom of claim 5, in which the sheet includes a section containing ordering information.

8. The mobile merchandise showroom of claim 1, further including at least one additional scrolling display for displaying advertisements or messages through another one of the panels.

9. The mobile merchandise showroom of claim 1, further including a lighting system for providing lighting for the showroom.

10. The mobile merchandise showroom of claim 9, wherein the lighting system is configured to provide rear lighting for the scrolling display.

11. The mobile merchandise showroom of claim 10, wherein the lighting system includes light sources at one or more locations selected from a floor, ceiling and panel locations of the mobile merchandise showroom.

12. The mobile merchandise showroom of claim 1, further including a fastening system for securing merchandise items against movement while the mobile showroom is being driven.

13. The mobile merchandise showroom of claim 12, wherein the merchandise fastening system comprises floor-mounted tracks and movable fasteners on the tracks that can be secured to the tracks at desired positions and to which merchandise items can be fastened.

14. The mobile merchandise showroom of claim 1, further including a control box that provides controls for moving the scrolling displays.

15. The mobile merchandise showroom of claim 14, in which the control box is programmble by and operator.

* * * * *